June 13, 1944. L. H. OSWALD ET AL 2,351,063
GARMENT TREATING APPARATUS
Filed Aug. 22, 1941 9 Sheets-Sheet 1

Inventors:
Leslie H. Oswald
Arthur S. Mann
John H. Wahlbeck
By: Leonard S. Chinfeel
Atty.

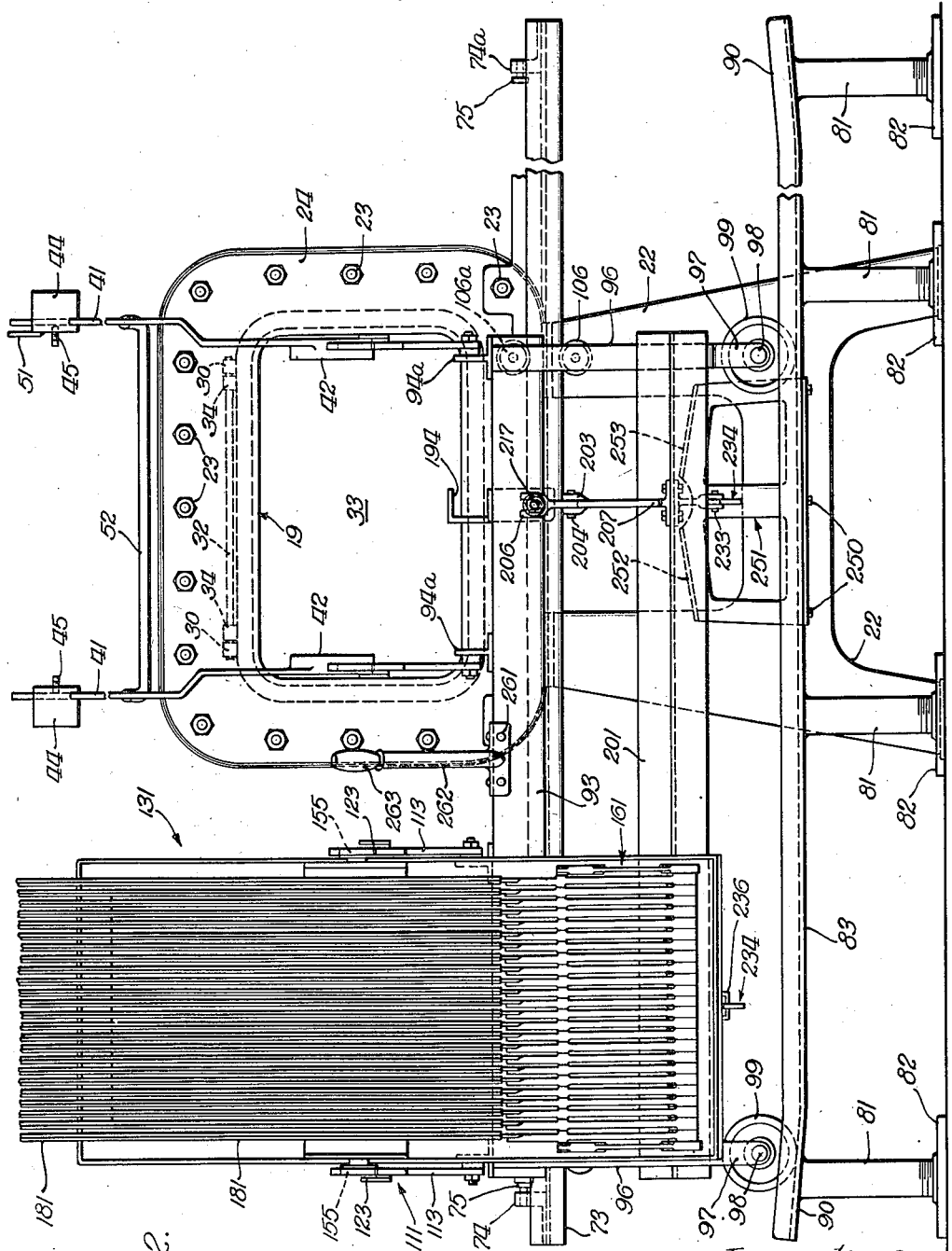

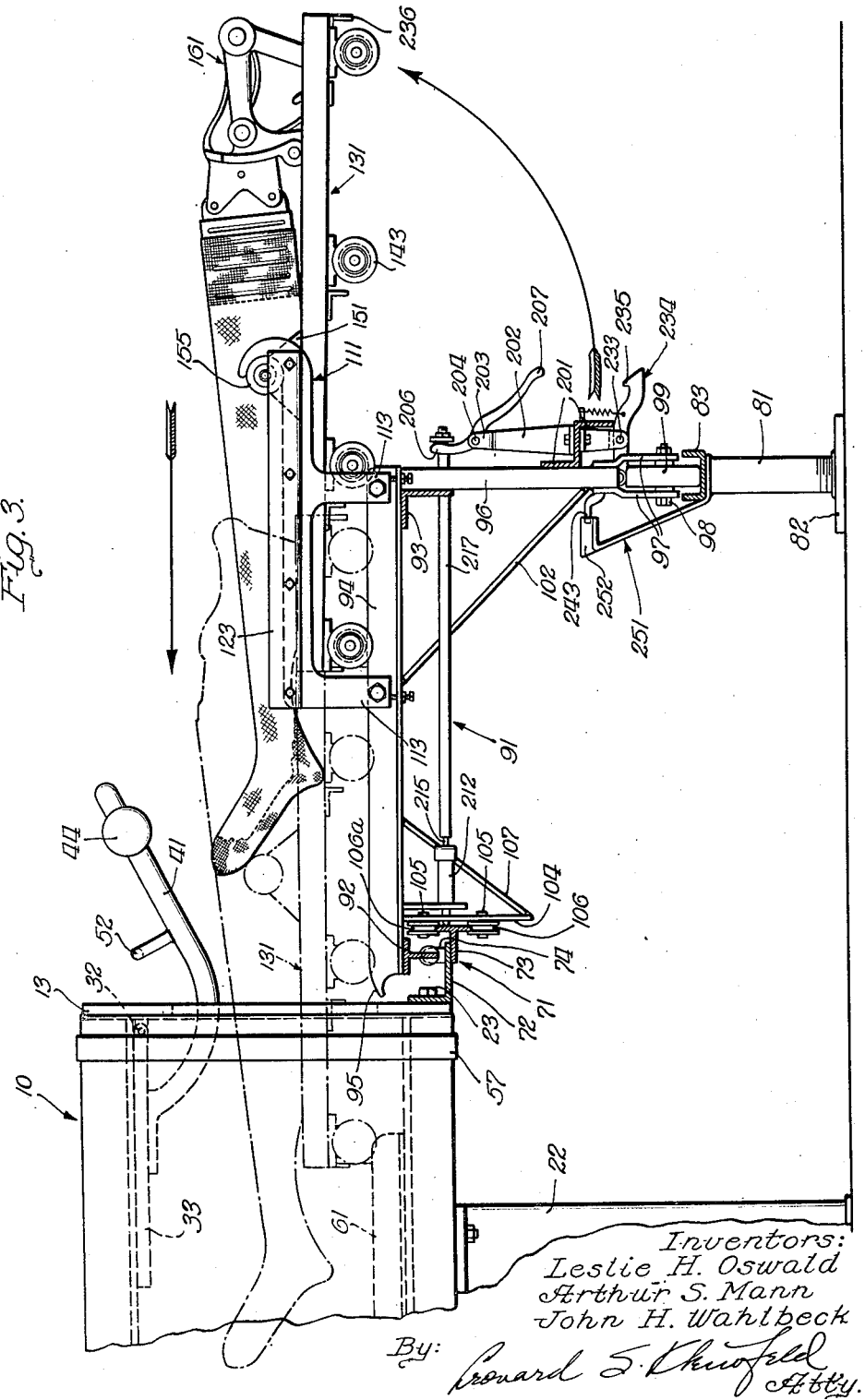

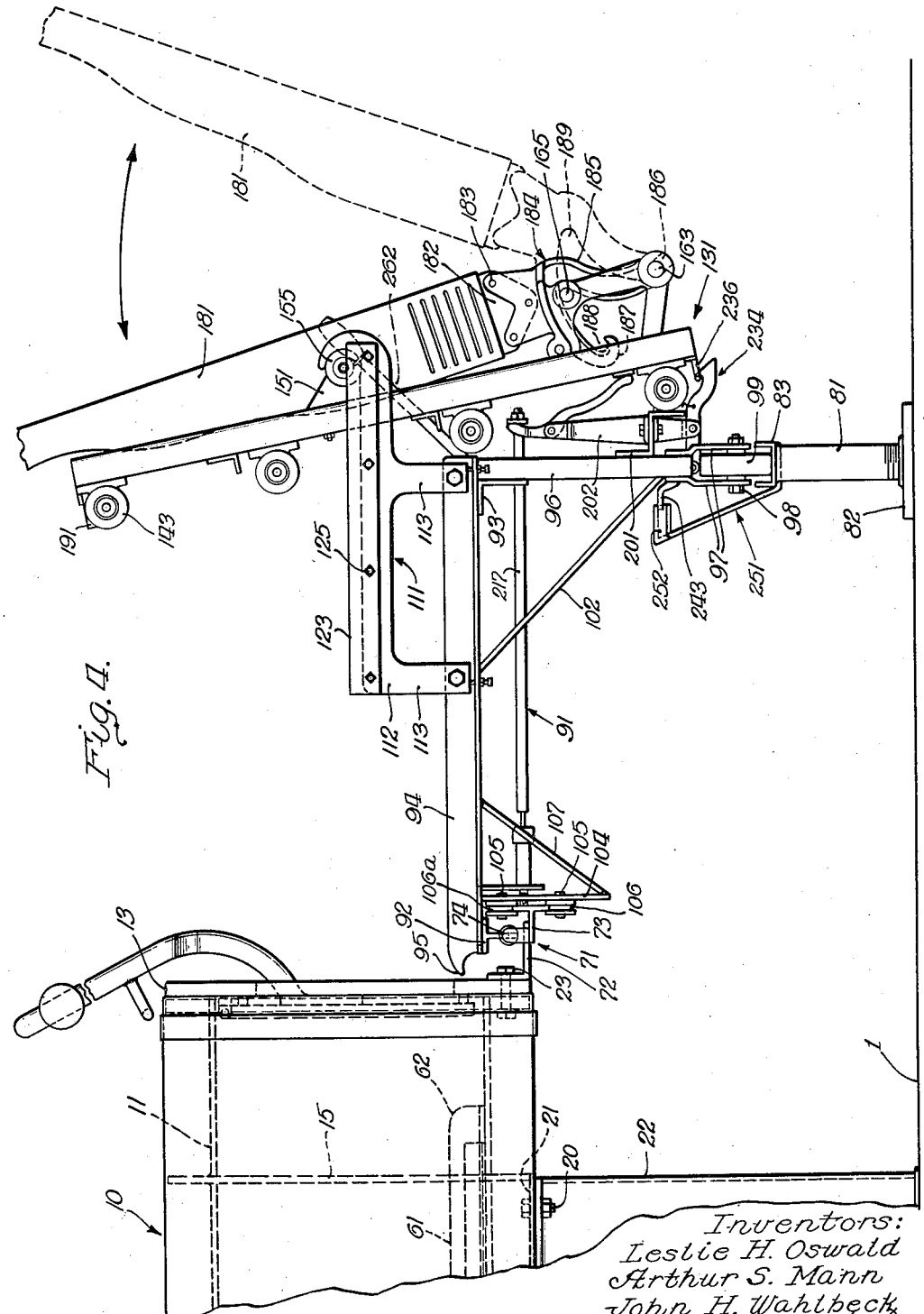

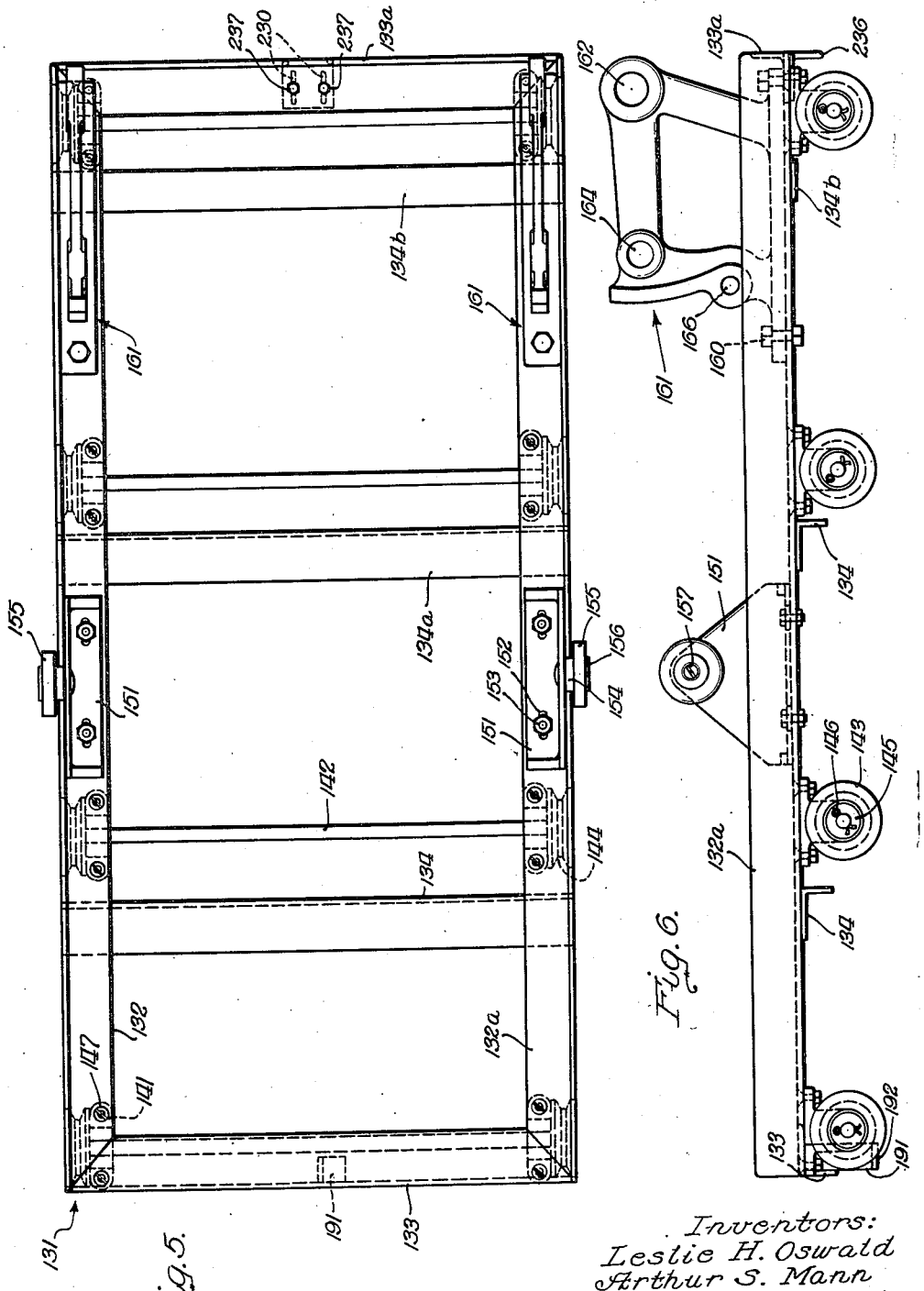

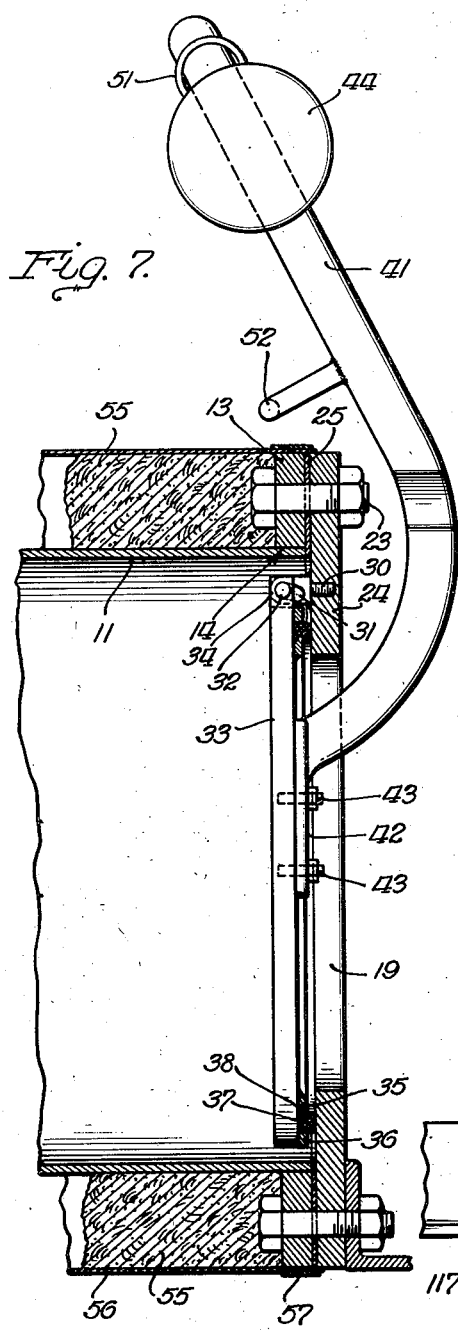
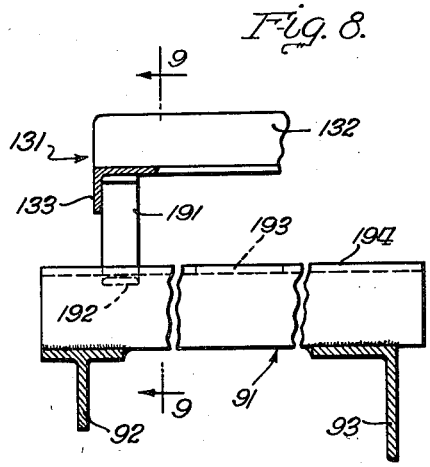
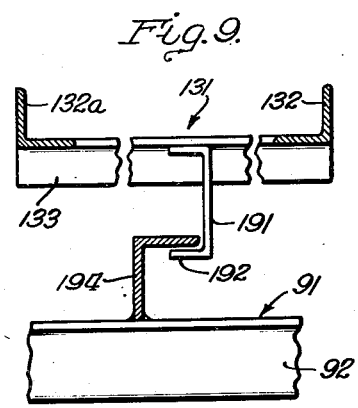
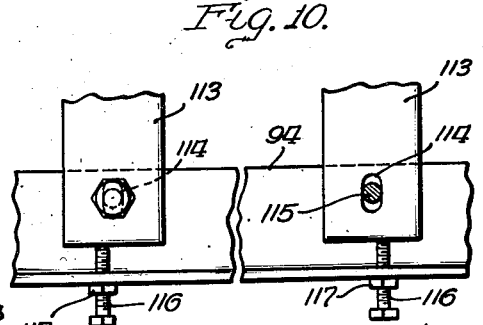

June 13, 1944.  L. H. OSWALD ET AL  2,351,063
GARMENT TREATING APPARATUS
Filed Aug. 22, 1941  9 Sheets-Sheet 7
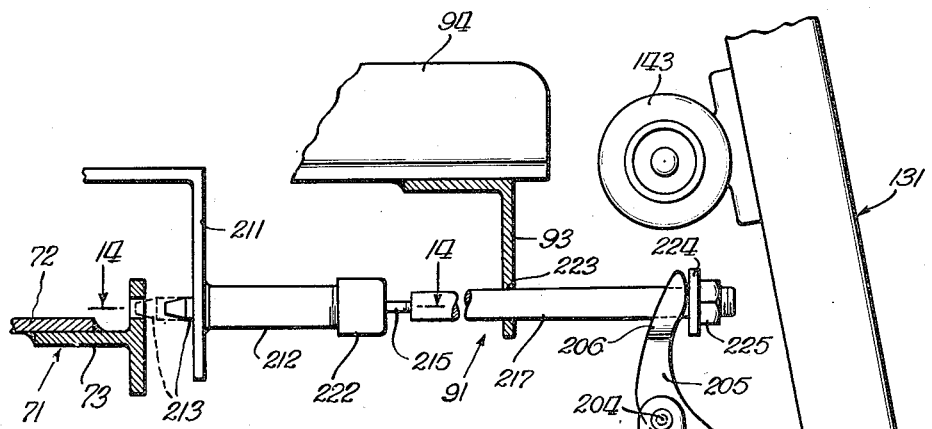
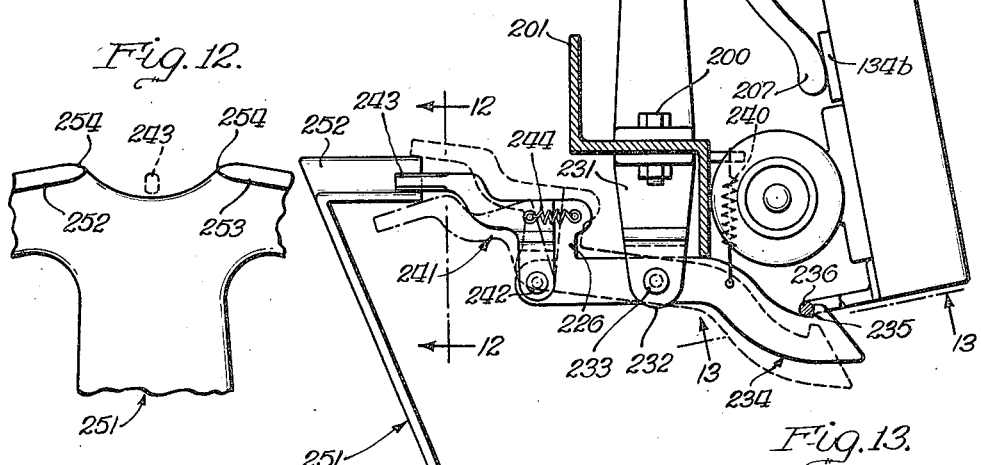
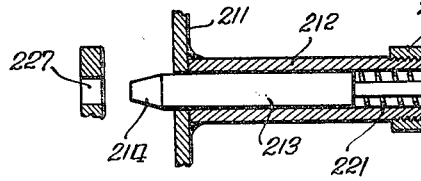
Inventors:
Leslie H. Oswald
Arthur S. Mann
John H. Wahlbeck

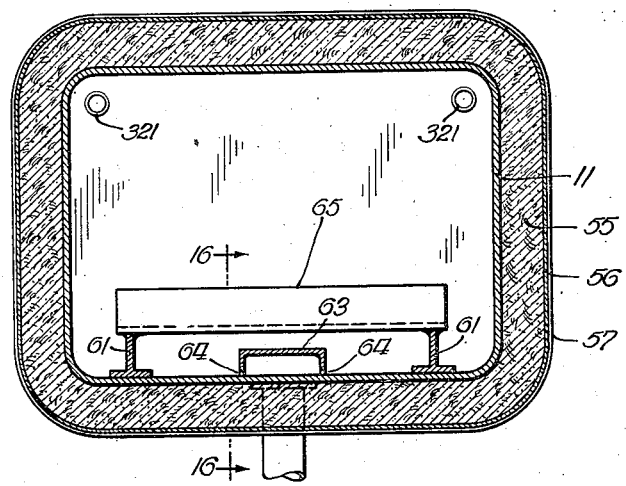
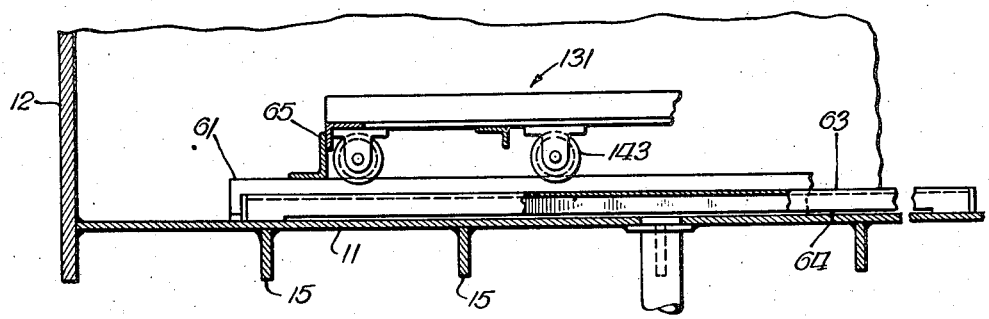
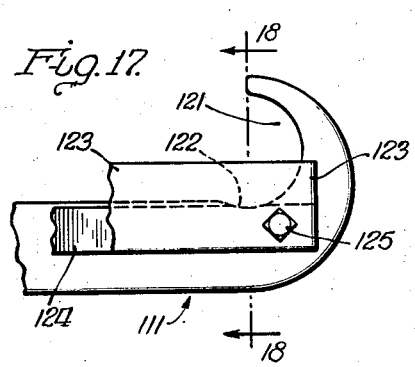
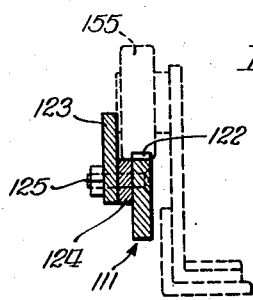

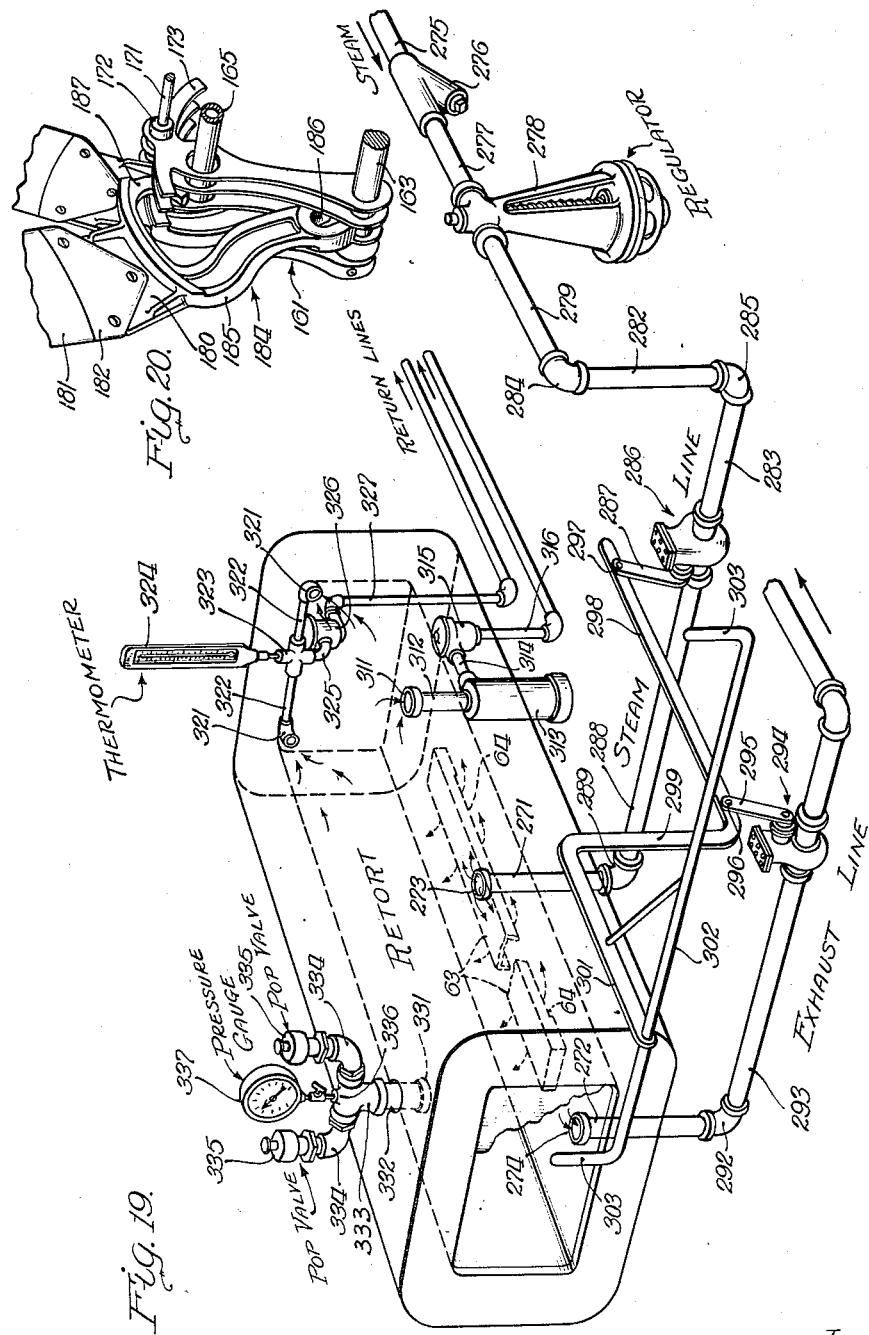

Patented June 13, 1944

2,351,063

UNITED STATES PATENT OFFICE 2,351,063

GARMENT TREATING APPARATUS

Leslie H. Oswald, Chicago, and Arthur S. Mann and John H. Wahlbeck, Kankakee, Ill., assignors to Paramount Textile Machinery Co., Kankakee, Ill., a corporation of Illinois Application August 22, 1941, Serial No. 407,952

21 Claims. (Cl. 223—76)

This invention has reference to apparatus for treating textile articles, and more specifically to an autoclave for setting the shape thereof.

Fibers derived from polyamides, particularly polyhexamethylene adipamide, are used in making textile yarns for fabrication into various articles of wearing apparel or other textile articles. Said yarns are commonly used for hosiery which is required to be presented to the consumer in a flat pressed, presentable condition. There are various processes for performing this operation, all of which require that at some stage between the knitting and the boxing of the goods, the fabric must be "set." If the dyeing or other hot liquid treatment, e. g. special finishing compounds, to which the fabric may be subjected, is performed while the fabric is in the by-chance wrinkled or distorted shape it happens to assume in the hot bath, the conditions of heat and moisture therein prevailing will set said wrinkles or distortions and the same are then practically impossible to remove. Accordingly, in order to avoid this undesirable result, it becomes necessary to set the fabric while it is either in the natural, loose condition it possesses after knitting or is supported on a form. The first alternative is described in the art as the Dunn process and is performed as disclosed in United States Patent No. 2,333,160 granted to George E. Dunn on November 2, 1943, and application Serial Number 351,654, filed by George E. Dunn and Henry Richter on August 7, 1940; the second alternative is referred to in this art as the Du Pont process and is disclosed in Patent No. 2,157,119 granted on May 9, 1939 to John B. Miles, Jr. In either process, the fabric, e. g. a stocking, is subjected at some stage to the action of wet steam at a temperature of approximately 240° F. for approximately 3 minutes, although it is comprehended that other hot, wet setting agents may be used at a different temperature and for a different time.

Accordingly, this setting operation must be performed at a temperature and for a time predetermined as yielding a non-distortable fabric under customary dyeing or other hot liquid treatment, in a chamber designed to accommodate the goods in a productive manner and to withstand the pressure of the steam ordinarily employed.

Therefore, the principal object of this invention is an autoclave designed to yield maximum productivity consistent with the nature of the pressure medium employed.

Furthermore, the setting operation, e. g., in the case of hosiery, as stated, occupies about three minutes at a steam pressure of approximately ten pounds gauge, so that the autoclave is loaded and unloaded at frequent intervals. Apparatuses presently in use include a closure that is clamped over the service opening in the vessel by handwheels or by automatically operated locking means. In either case substantial time is taken to close and open the vessel as manual means is obviously slow, and automatic means must of necessity be relatively slow due to the extreme pressure required to properly seal the vessel. Moreover, equipment now in use comprises a closure sealed by outwardly applied mechanical force and the opposing steam pressure within is constantly tending to break the seal, resulting in leakage and a hazardous condition.

Accordingly, another important object of the invention is to provide an autoclave for the purpose intended provided with a closure independent of any manual or automatic clamping means as now recognized in the art, and sealed only by the pressure of the steam within, so that as the pressure is increased the joint is sealed tighter.

Autoclaves now available are not provided with a form mounting designed to yield maximum production. In some cases the forms are spaced rather far apart so that the operator is required to walk considerable distances in the course of a day. Other equipment requires the operator to wait until automatic means bring the forms into position for handling, while still others require some manipulation of a form supporting truck of considerable weight, to bring the forms into proper relation with the autoclave.

Therefore another object of this invention is to provide in connection with an autoclave of the type referred to form carrying means necessitating the least manual effort on the part of the operative while being capable of maximum production.

Another object is to provide in connection with such an autoclave, simple and foolproof steam circulating means designed to fill and exhaust the vessel in a minimum time.

Still another aim is to provide an autoclave of such shape as to accommodate the forms in a minimum space and thereby reduce the volume to be filled with and emptied of the setting medium.

Other objects will appear as the description proceeds, it being understood that although the same, for purposes of illustration, refers to a hosiery article, the apparatus is capable of use for other textile articles.

In the drawings:

Figure 2 is a front elevational view thereof;

Figure 3 is a side elevational view taken facing the operative and showing a form carriage in a horizontal position;

Figure 4 is a view taken from the same side as Figure 3, but showing the form carriage in its vertical position;

Figure 5 is a plan view of a form carriage;

Figure 6 is a side elevational view thereof;

Figure 7 is a partial cross section through the closure of the autoclave;

Figure 8 is a detail in partial cross section of a form carriage anchor;

Figure 9 is a view on the line 9—9 of Figure 8;

Figure 10 is a detail of the means for adjusting the trunnion tracks;

Figure 11 is a detail of the carriage and truck locking mechanism;

Figure 12 is a view on the line 12—12 of Figure 11;

Figure 13 is a section on the line 13—13 of Figure 11;

Figure 14 is a section on the line 14—14 of Figure 11;

Figure 15 is a cross section on the line 15—15 of Figure 1, showing the carriage back-stop;

Figure 16 is a cross section on the line 16—16 of Figure 15;

Figure 17 is a detail of the trunnion support;

Figure 18 is a cross section on the line 18—18 of Figure 17;

Figure 19 is an isometric phantom-like view of the steam circulating system;

Figure 20 is a detail of two form supports and their associated spacers and dividers.

Figure 1:
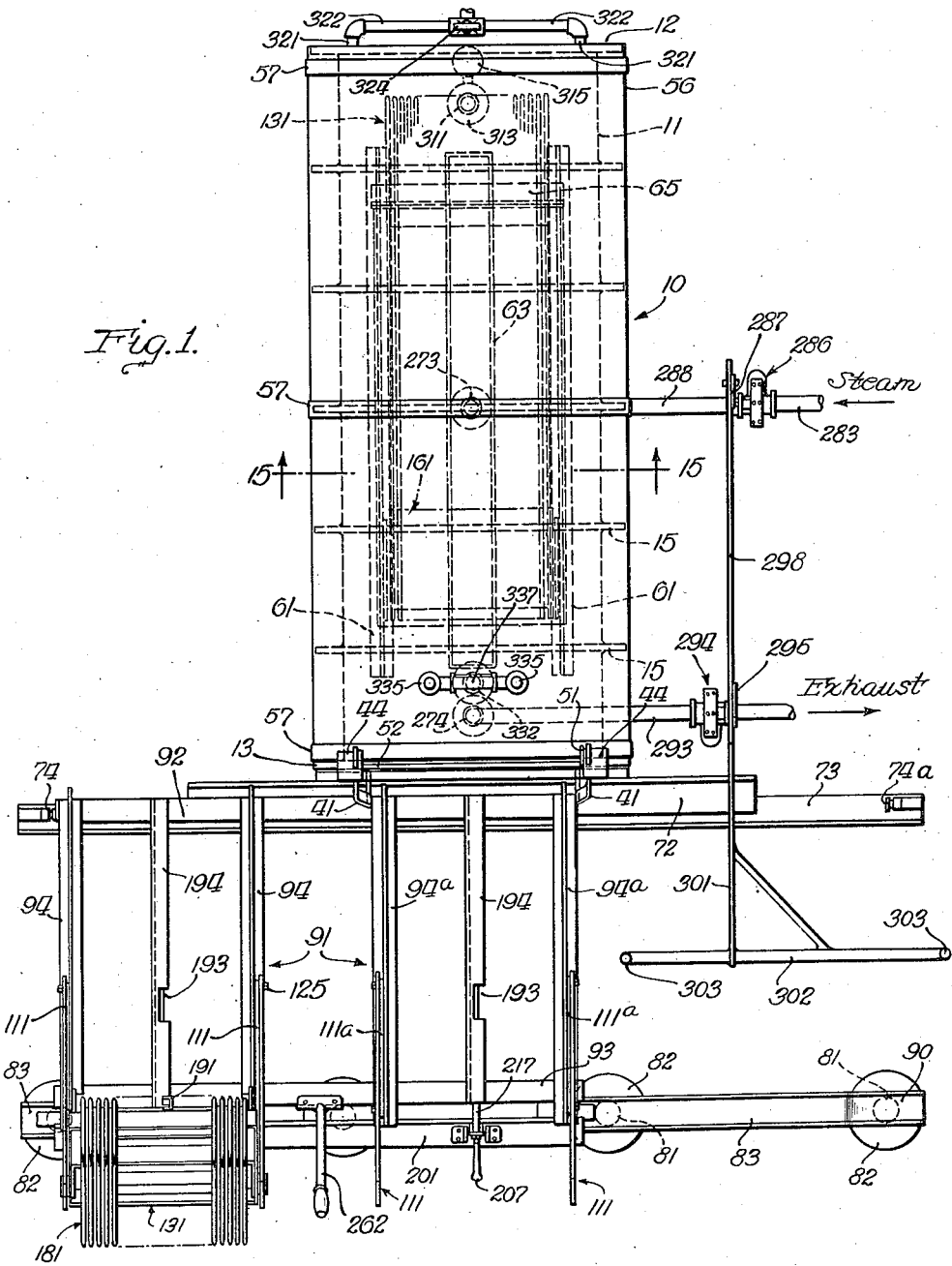
Figure 1 is a plan view of the apparatus.

In several of the figures inconsequential parts are broken away for clarity.

Referring to Figure 1, 10 represents the autoclave proper comprised of a shell 11 rectangular except for rounded corners as shown in Figure 15, closed at the rear by a plate 12 welded or otherwise attached to shell 11, and provided at the front with a flange 13 having a rectangular opening 14 conforming to the outside of the shell 11 and welded or otherwise attached thereto (see Figure 7). At intervals spaced longitudinally of the shell 11 are provided the stiffening ribs 15 extending entirely around the periphery thereof and homogeneously welded thereto to secure the required rigidity and strength.

Affixed, by means of bolts 20, to cross members 21 fastened to the lower edges of pairs of ribs 15, are the legs 22, only one of which may be seen in Figure 2, it being understood that there is an identical leg toward the rear of the chamber. Said legs support the vessel on the floor 1 and may be bolted thereto for rigidity. Attached to the front face of flange 13 by means of bolts 23 is the door frame 24, co-extensive with the outer perimeter of flange 13 and forming a steam tight joint therewith by means of gasket 25. In the approximate center of door frame 24 is a rectangular opening 19 through which the form carriages pass for entry to or exit from the interior of the vessel. To the inner surface of door frame 24 is fastened a pair of hinge members 30 each consisting substantially of a rectangular block provided with a slotted hole 31 therethrough and inclined, as shown, at a slight angle to the axis of member 30. Suspended upon a hinge pin 32 extending through holes 31 is the door 33 substantially rectangular in shape and overlapping the edges of the opening 19, as clearly shown in Figure 7. A pair of lugs 34 provided at the upper edge of said door 33 accommodates the hinge pin 32. Fitted into a recess formed by retaining strips 35 and 36 extending entirely around the periphery of the door 33 is the gasket 37 extending around said periphery and clamped in position by the inwardly sloped edges of said strips, such as 38. Either or both members 35 and 36 may be provided with screws (not shown) to facilitate gasket renewal. It will be noted that gasket 37 will form a steam tight seal between door frame 24 and door 33 when pressure is applied from the interior of the vessel, the slotted holes 31 permitting freedom in the hinge for that purpose.

To facilitate opening and closing of door 33, there is provided a pair of arms 41, each terminating in a flange 42 bolted as at 43 to the front face of door 33. Each said arm 41 is curved upwardly and rearwardly as shown, and carries at its upper extremity a counterweight 44 held in a predetermined position on arm 41 by a screw 45. Furthermore, the right hand counterweight, as viewed in Figure 2, is provided with a U-shaped portion 51 for engagement by an implement to tilt the door beyond a normal rest position for easy opening and closing and as explained hereinafter. A transverse strut 52 joins arms 41 to maintain them in a rigid position. It will be observed that counterweight 44 is to the rear of the center of hinge pin 32 for a purpose to be pointed out. Completely surrounding the shell 11 is insulating material 55 for inhibiting transmission of heat from the chamber and the cooling effect of the lower room temperature. Said insulation 55 is retained in place by sheet metal lagging 56 held in place by peripheral binding straps 57 at reasonable intervals lengthwise of the vessel.

Fixedly mounted on the floor of the shell 11 are the rails 61 each comprising a bar of T-shaped cross section terminating at the front end of the vessel in a rounded corner 62. Also fixedly mounted on the floor of the shell 11 is the steam baffle 63 comprising a box-like member closed at the top and both ends and snugly fitting the floor of the shell 11, except for the apertures 64 cut into each side of said baffle, as clearly shown in Figures 15 and 16. Transversely of rails 61 and fixedly mounted thereto is the carriage stop bar 65 (Figures 15 and 16) of L-shaped cross section.

Affixed to door frame 24 by the lower row of bolts 23 and transversely of the vessel (Figure 3) is the rear truck rail 71 comprised of an L-shaped member 72 affixed to a T-shaped member 73, the member 72 being substantially the width of the door frame 24, and the member 73 extending considerably to either side thereof as shown in Figure 2. Mounted at the extreme ends of rail member 73 are the bumpers 74 and 74a incorporating a semi-hard rubber button 75 to absorb shock as the truck is moved to each terminus of its crosswise path. Carried on the floor by means of posts 81 attached to the lower surface thereof is the front truck rail 83, each said post carrying a vertically adjustable flange 82. Flanges 82 are provided with holes for screws (not shown) for fastening the rail 83 to the floor, and by threaded engagement with posts 81, truck rail 83 is easily placed at its proper elevation and levelled, whereupon the screws are inserted for fixing the rail assembly to the floor. Rail 83 is co-extensive with rail 73 (Figure 2) and is of channel cross section. It will be observed that for a short distance at each end rail 83 is sloped slightly upwardly as at 90 for a function to be explained.

Superimposed on rails 73 and 83 is the truck 91 (Figures 1, 3 and 4) including a rear transverse T-shaped support 92 and a front L-shaped transverse support 93. Two pairs of rails 94 and 94a of T-shaped cross section are affixed to supports 92 and 93 and terminate at their inward ends in a curved portion 95. Extending downwardly and affixed thereto at each end of support 93 are the legs 96, each terminating in a stirrup formed of two bars 97 affixed to the front and rear faces of each leg 96 and in which is carried the shaft 98 supporting the roller 99. Diagonal braces 102 assist in maintaining the proper relation of legs 96 with respect to the rails 94 and 94a. Affixed to the rear of the outer one of pairs of rails 94 and 94a are the downwardly extending members 104 carrying thereon on pivots 105 the circumferentially grooved rollers 106 and 106a, said rollers engaging the vertically extending portion of rail 73 as clearly shown. Diagonal braces 107 affixed to the said rails 94 and 94a and members 104 afford rigidity for the latter.

From the foregoing it will be noted that the structure comprising the rails 94 and 94a, rollers 106 and 106a, and rollers 99 constitute a transversely operable truck manually movable from the extreme left hand position depicted in Figure 2 to an extreme right hand position and vice versa.

Fastened towards the front extremity of rails 94 and 94a (Figures 1 and 4) and extending vertically therefrom are the pairs of trunnion supports 111 and 111a comprising a horizontal body portion 112 and two downwardly extending leg portions 113. The lower extremity of body portions 113 is provided with a slotted hole 114 (Figure 10) through which fastening bolts 115 pass for maintaining trunnion supports 111 and 111a in their position with respect to the rails 94 and 94a, while permitting vertical adjustment thereon by reason of an adjusting screw 116 provided with a lock nut 117 bearing on the under end of each leg portion 113. At its forwardly extending end each trunnion support (Figure 17) is provided with an arcuate portion forming a substantially semi-circular recess 121, which, together with the upper edge of member 111 forms a slight curved depression 122. Mounted on the outer surface of each trunnion support 111 and 111a is the guard rail 123 (Figure 18) extending substantially the entire length of said supports, spaced therefrom by spacer bars 124 and affixed thereto by bolts 125.

Arranged to be rolled on rails 94 and 94a and rails 61, is the pair of form carriages 131. Each carriage (Figures 5 and 6) comprises a rectangular frame composed of side members 132 and 132a and end members 133 and 133a, mitered and welded at the corners. It will be noted at this juncture that members 132, 132a, 133 and 133a are all of relatively thin right angled cross section for lightness and rigidity, and further, that the vertical leg of member 133 at the top of the carriage extends downwardly and member 133a at the bottom extends upwardly. Transverse stiffening members 134, 134a and 134b provide further rigidity. Carried in pillow blocks 141, four on each side of each carriage 131 and attached thereto by bolts 147, are the transverse shafts 142 supporting at their extremities the rollers 143, eight in number, each roller being provided with a substantially V-shaped circumferential groove 144 to maintain said carriage on its rails and facilitate transference of a roller from rail 94 or 94a to a rail 61, and supported on shaft 142 by an anti-friction bearing (not shown). Said bearing is retained by means of washer 145 and cotter key 146.

Mounted on side members 132 and 132a are the trunnion bearing brackets 151, maintained in an adjustable relation with respect to frame members 132 and 132a by means of slotted holes 152 and bolts 153. Each said bracket 151 extends outwardly from frame 131 as shown in Figure 6 and supports on a fixed pivot 154 thereon the rollers 155, comprising an anti-friction bearing and retained in place with respect to pivot 154 by a washer 156 and screw 157.

At the lower extremity of frame members 132 and 132a is affixed, by means of bolts 160, the pair of brackets 161. Supported in holes 162 in brackets 161 is a transverse shaft 163 and in holes 164 a transverse shaft 165 (Figure 4). Shaft 163 serves as a support for the form bases to be hereinafter alluded to, and shaft 165 is a stop bar. Carried on a transverse rod 171 maintained in holes 166 in brackets 161 are the spacers 172 and dividers 173 (Figure 20), the former consisting of collars slipped over shaft 171 and the latter being thin sheet metal plates substantially co-extensive with each form base (as shown), to obviate friction between an adjoining pair of bases and maintain the parallel alignment of the forms.

Although it will be apparent that the apparatus herein disclosed is adaptable to the handling of various types of wearing apparel, we have, for purposes of illustration, disclosed the same as for handling ladies' hosiery. With this in view 181 depicts a hosiery form of conventional type having a substantially oval cross section and comprised of two thin sheets cut to the proper edgewise contour and fastened together at their edges by welding or otherwise to result in crease-producing edges. The form terminates in a substantially triangular, relatively thin base portion 182 integral with the form proper as by welding or equivalent and fastened as by means of screws 183 to a form support 184.

Each said support 184 comprises a form mounting portion 180 extended into a substantially S-shaped downwardly directed leg portion 185 terminating in a U-shaped opening 186 adapted to engage the shaft 163 for instantaneous removal and replacement of a form from the carriage 131. Portion 180 of said support 184 is provided at one side with a hook-shaped portion 187 forming a U-shaped opening 188 to engage shaft 165 when the form is in its forward or dotted line position as shown in Figure 4 and to determine the extent of forward travel thereof. The substantially semi-circular recess 189 formed by the junction of leg 185 with portion 180 engages shaft 165 when the form is in its normal or backward position and serves to limit the backward travel thereof. The plurality of forms 181, in this case twenty-four to each carriage 131, are arranged in closely adjacent parallel relation for compactness and ease of boarding and stripping (usually multiples of three forms), and through the construction described, each form is individually movable from forward to backward position or vice-versa without interference with forms adjacent thereto, and into a position where the entire form is clear of its neighbors to permit unhampered handling of goods thereover. It will be understood that each apparatus includes two carriages 131, each with its complement of forms 181, one set thereof being shown (Figure 1) in forward or operating position, and one set shown in dotted lines inside of the vessel for treatment.

Each carriage 131 is provided at its rear end (Figures 5 and 6) with a substantially C-shaped downwardly extending lug 191, provided at its lower extremity with a transversely extending end portion 192 adapted, upon rocking of a carriage from vertical to horizontal position, to enter a notch 193 in the members 194 extending from front to back of the truck 91 (Figures 1, 8 and 9).

To lock the truck 91 in its right or left hand position, the indexing mechanism detailed in Figures 11 and 14 is employed. A horizontal strut 201 of substantially Z-shaped cross-section attached at its extremities to legs 96, carries at points corresponding to the center lines of rails 94 and 94a two upwardly extending brackets 202 fastened by bolts 200. Bracket 202 terminates at its upper end in a bifurcated portion 203 carrying a pivot 204 on which is mounted the lever 205. Said lever extends substantially upwardly in a bifurcated portion 206 and substantially downwardly in an operating head 207 adapted to be engaged by member 134b of carriage 131. Affixed to a downwardly extending bracket 211 on the truck 91 is the forwardly extending tubular guide 212 supporting in sliding relation therewith the index pin 213. Said pin terminates at its rear end in a tapered portion 214 and at its other end in a reduced portion 215 threadedly engaged as at 216 with the rod 217. Pin 213 is urged rearwardly by compression spring 221 maintained within the tube 212 by threaded cap 222. Rod 217 is slidably guided through hole 223 in transverse support 93 and carries at the forward end thereof a washer 224 retained by a nut 225. Said washer 224 is adapted to be operated upon by portion 206 as shown. At the center line of the vessel the rail 73 is provided with a hole 227 adapted to be engaged by tapered portion 214.

To retain each carriage 131 in its substantially vertical or operating position, and automatically to release the same at predetermined times there is provided the locking mechanism illustrated in Figures 11, 12 and 13. Also carried by bolts 200 on transverse strut 201 are the two downwardly extending brackets 231 each terminating in a bifurcated portion 232 and carrying a pivot 233 on which latch 234 is adapted to rock. Said latch 234 terminates forwardly in a hooked portion 235 adapted to engage a U-shaped staple 236 fixedly mounted as by screws 237 on carriage frame member 133a but adjustable with respect thereto by reason of slotted holes 230. A spring 240 urges said latch and staple into engagement. The opposite end of latch 234 extends rearwardly, and is provided with a trigger 241 pivoted at 242 to said latch and of substantially L-shaped construction, the rearwardly extending tail piece 243 terminating in an operating portion having upper and lower slightly rounded cam engaging surfaces as shown in Figure 12. Trigger 241 is maintained in operative relation with respect to latch 234 by means of tension spring 244 attached thereto and to an upward extension 226 of latch 234, the said extension serving to limit the clockwise rotation of trigger 241.

Supported on rail 83 as by screws 250 is the fixed cam 251 formed at its upper side by cam segments 252 and 253 extending forwardly and sloped from the center out downwardly, as shown in Figures 2 and 12. The inner edges of said segments are rounded as at 254.

Affixed to cross member 93 by screws 261 is the operating handle 262 terminating in a rubber handle 263 and extending forwardly approximately on a 45 degree angle (Figure 4).

Referring now to Figure 19, there is shown a somewhat diagrammatic representation of the steam piping and its auxiliary fittings, the retort chamber proper being represented in a somewhat phantom-like manner for clarity. Located along the central axis of the floor of the chamber 11 are the steam inlet nozzle 271 and exhaust nozzle 272, there being flanges 273 and 274, respectively, welded or otherwise fastened to the bottom of the retort into which said nozzles 271 and 272 may be screwed in a well known manner. Steam inlet pipe 275 enters a strainer 276 for the removal of foreign particles from the steam, and a pipe 277 connects said strainer with a pressure reducing and regulating valve 278 of any common type. From the outlet of said valve a line composed of pipes 279, 282 and 283 and elbows 284 and 285 enters a so-called cam action valve 286, which comprises a body enclosing a gate (not shown) operated by a handle 287 by means of which the gate may be instantaneously operated to close off or open the steam line. A pipe 288 and elbow 289 connect to the nozzle 271.

The nozzle 272 connects into elbow 292 and through pipe 293 to another valve 294, identical in construction with valve 286, but designed to open and close by a movement of its handle 295 opposite to that of 287 for a purpose which will appear. From valve 294 the exhaust steam may pass through piping to the atmosphere or to any steam reclaiming device. Interconnecting said valve handles 295 and 287, through pivots 296 and 297, is the link 298 which, at its forward end is offset vertically as at 299 into a forwardly extending portion 301 supporting an operating handle 302 extending transversely of the machine. Said handle 302 is provided with upwardly turned hand gripping portions 303 for manual operation of said valves 286 and 294. Screwed into another flange 311 welded or otherwise fastened in the floor of the chamber is a pipe nipple 312 terminating in a dirt pocket 313 from which passes the nipple 314 entering a trap 315, the exhaust side of said trap being connected as by a pipe 316 to any suitable discharge point.

Into the rear face of the retort are fitted the street elbows 321 connected as by nipples 322 to the pipe cross 323. In the upward extension of said cross 323 is fitted a thermometer 324 and in the lower extension of said cross is fitted an elbow 325 connecting to an air vent 326 whose discharge side empties as through pipe 327 into a suitable return line. Screwed into a flange 331 fastened to the roof of the chamber is a nipple 332 on which is mounted the T 333 into each sidewise extending arm of which are fitted the street elbows 334 each carrying a safety pop valve 335. Into a small upper opening 336 of the T 333 is mounted the steam pressure gauge 337.

Operation

Referring to Figures 1, 2 and 4, it will be assumed that one carriage 131 of forms is within the retort chamber 11 and the door 33 closed, and the other carriage is outside the chamber in the position shown in Figures 2 and 4; also that a treating cycle has been completed and the steam inlet valve 286 closed and exhaust valve 294 opened, as shown in Figure 19.

At this time the steam which was within the retort for the cycle just completed is relieving itself through nozzle 272 and exhaust valve 294 to drain. As soon as said pressure is approximately equal to atmospheric pressure, the door 33, which has been held closed by the steam pressure within (Figure 7) may, under the vacuum created and the influence of counter weights 44 acting through arms 41, open, whereby the door 33 swings about its pivot 32 in a clockwise direction to the dotted line position of Figure 3.

While this treating cycle has been proceeding, the operator has been working on the carriage 131 of forms shown in a substantially vertical position in Figure 4, that is to say, she has withdrawn the previously treated stockings from the forms 131 and has been covering each form with another stocking to be treated. For this purpose each form is grasped with the fingers and drawn from the full line position to the dotted line position in front of the operator, who stands in a position facing the right hand side of the forms. Each fresh stocking is charged immediately following the stripping of the previous stocking and the form is then manually moved to its rearward position, the form rocking for this purpose about the pivot 163 and attaining a rest position rearwardly, as described. Maintenance of the parallel vertical alignment of said forms is provided by the separators 173 between a pair of which each form base 184 is adapted to slide.

Now that all of the forms in a set, in this instance twenty-four, are charged and the door has opened, the operator may withdraw the carriage from within the retort to its forward position, as follows. By means of an implement (not shown) comprising a wooden handle provided with a hook at one end, the operator takes hold of the forward shaft 142 of said carriage and draws the same towards the front (Figure 3), the carriage wheels 143 rolling on tracks 61, and then on tracks 94a, the curved inner end 95 of said tracks meanwhile facilitating the engagement of said wheels therewith. The carriage is rolled forward until trunnion rollers 155 engage the recess 121 in trunnion tracks 111 wherein they rest with the aid of the depressions 122 in said tracks. When said rollers 155 are so engaged the carriage with its forms is counter balanced so there is no decided tendency for it to tilt from a horizontal plane in either direction. The operator dispenses with the hooked implement and manually grasping the forward end of said carriage biases it downwardly to the position shown in Figure 4, whereupon staple 236 engages hook 235 to maintain said carriage in that position.

When carriage 131 is moved to its substantially vertical position plate 134b will strike the end 207 of rocker 205, rotating the same in a clockwise direction, as seen in Figure 11, to cause portion 206 to bear against washer 224, and thereby move rod 217 forwardly against the pressure of spring 221, to disengage locking pin 214 from its hole 227. Up until this time said pin has been in engagement with its hole to prevent accidental transverse movement of the carriage 91.

Taking hold of handle 262, the operator moves truck 91 on its rollers 99, 106 and 106a to the right until stop 74a is engaged, at which time tracks 94 are aligned with tracks 61. Because of the upward incline of the left hand end of rail 83 the truck is given a slight tendency to roll under gravity to the right, thereby facilitating movement thereof in that direction.

Upon movement of truck 91 to the right, tail piece 243 associated with the left hand carriage will ride over the upper surface of cam 252, rotating latch 234 in a clockwise direction to release hook 235 from staple 236, as shown in the dotted line position of Figure 11. The carriage of forms may now be manually rotated from vertical to horizontal position about the trunnion bearings 155 and rolled within the retort, the reverse of the motion described for unloading a carriage therefrom. The movement of carriage 131 from vertical to horizontal position will release the pressure on lever 205, permitting spring 221 to force locking pin 214 into engagement with hole 227, thereby preventing accidental transverse movement of truck 91, while charging of the retort proceeds.

As soon as the said group of forms is within the retort, the operator, by means of the implement aforementioned, takes hold of the brace rod 52 and swings door 33 closed against the counterweights 44, the same rising to occupy a position wherein the center of gravity of the assembled door, arms, counterweights and associated parts, is within the pivot 32 to bias said door into a substantially closed condition.

The operator, by means of a handle 303, moves link 298 forward to open the steam inlet valve 286 and close exhaust valve 294, whereupon steam enters the retort through nozzle 271, baffle plate 63 and openings 64. Air is meanwhile forced out through nozzle 312 and trap 315, fittings 321 and vent 326. Accordingly steam treatment of the goods proceeds for a predetermined period of time. Pressure, and hence temperature, of the steam is regulated in a well known way by valve 278. Safety valves 335 will come into play in the event said regulating valve becomes out of order and admits main line steam pressure to the vessel, there being two such valves as a safety factor. The operator may check on the pressure of the steam within the vessel by means of the gauge 337 and/or the temperature by means of thermometer 324. Baffle 63, as will be obvious, serves to dissipate the rapidly incoming steam generally over the entire floor of the chamber, so that a localized area of the stockings does not undergo too rigorous a treatment, and insures that all stockings receive a uniform conditioning.

While the steam treatment continues, usually about three minutes, the carriage of forms just withdrawn is now to the right, but in the position shown in Figure 4, having been locked therein as already described. Upon movement of the truck 91 from left to right, the latch 234 individual to that carriage remains unaffected by the cam 253 since, as will be seen in Figure 12, tail piece 243 will pass along the underside of cam 253 and trigger 241 rocked to the lower dotted line position shown in Figure 13 against the tension of spring 244. Such movement of trigger 241 is therefore ineffectual to disengage latch hook 235 from staple 236 and the carriage remains locked.

Having stripped and re-charged this group of forms, the preceding cycle is repeated, i. e., the valves 286 and 294 are moved to their reverse position by means of a handle 303 to shut off the steam and open the exhaust line 293, whereupon the steam pressure within the retort is relieved and operations follow as previously described. The forms bearing the treated group of stockings may now be withdrawn from the chamber onto tracks 94, the truck is then moved from right to left and the newly loaded group of forms placed within the chamber. As will be apparent from Figures 11 and 12, the tail piece 243 in this case will now ride over the upper surface of cam 253 to disengage latch hook 235 from staple 236, exactly as occurred on cam surface 252 in the case of the other carriage, the action for each carriage being symmetrical with respect to the center line of the apparatus.

To insure against accidental tilting of carriage 131 about its trunnion bearings 155, as the carriage of forms is rolling along trunnion supports 111, which action would cut the stockings if the forms were to strike the retort door or door frame (Figure 3), the lug 192 on each carriage (Figures 8 and 9) engages the member 194 until such time as the foot portion of the forms is clear of the door frame 24 when lug 192 will be opposite opening 193 and the carriage is freed to be tilted from horizontal to vertical position.

By means of the novel construction of the track 83 the same may be adjusted level on the most irregular floor by rotating each flange 82 with respect to the posts 81 and so facilitate movement of the truck 91 transversely of the machine.

Since in the course of a day many different sizes of stockings may be handled on one machine, forms having different foot sizes are employed. In the operation of the machine only forty-eight forms are in use at one time, but these may be rapidly interchanged with others merely by lifting the mounted form substantially in a vertical direction to disengage slot 186 from shaft 163 and a new form may be slipped into place in lieu thereof (see the partially dislodged form in Figure 20).

From the preceding description, it may be noted that the machine herein disclosed is extremely simple and practically devoid of automatic mechanism, which is subject to adjustment and extraordinary care, and there are no delicate parts which may become damaged due to careless handling, the entire machine being heavily built and rigid to withstand a great amount of abuse. The operations of opening and closing the valves, the swinging of the door and all truck and carriage movements are manual. In the industry to which this invention relates it is well recognized that the boarding room is, in a great majority of plants, a place of extremely simple equipment requiring little or no attention, and with the advent of nylon, it was extremely important to devise a preboarding apparatus which would receive no more than the maintenance offered in the average boarding room.

Furthermore, the machine is characterized by a single control for both the steam inlet and exhaust valve, so that the one is closed and the other opened simultaneously, or vice versa. For this purpose it is preferred to use a linkage so arranged that as the steam valve begins to open the exhaust valve is beginning to close, and vice versa. Thus, assuming that the door is not completely closed due to some accidental, temporary obstruction, and the steam is turned on, the exhaust valve will permit relief of the pressure within the vessel and mitigate any dangerous outrush of steam around the edge of the door. Air venting takes place through simple thermostatic traps having only one moving part and requiring no lubrication.

The horizontal design permits the insertion of the forms endwise into the vessel in a position yielding a vessel of the smallest possible dimensions, thereby economizing in the quantity of steam used for each cycle, and accelerating the time within which the vessel is filled with and emptied of steam. This shape also lends itself to simple application of adequate insulation and metal covering therefor, thereby reducing to a considerable extent wastage of steam due to condensation by the surrounding atmosphere, maintaining an extremely cool room condition and resulting in maximum comfort for the operator. Positioning the forms horizontally allows the steam to distribute itself most rapidly over the stocking area, and minimizes any disturbance of the welts which may occur if the steam is permitted to enter the vessel at a point below the open ends of said welts.

A safety factor of incalculable advantage is the use of a door which is sealed by internally applied pressure, which, as explained, is sealed tighter as the steam pressure increases. Hitherto vessels of this type have all used a door which is sealed to the outside of the retort by the externally applied pressure of clamps or hand wheels, operated manually, hydraulically or mechanically, and the internal steam pressure is constantly straining these parts and causing undue wear. In the present invention the pressure of the steam is taken entirely upon a gasket 37, which is cheap and rapidly replaceable. The door will tend to open itself by the vacuum created within the vessel as the steam is discharged and, through the counterweights, will remain substantially closed of its own accord until the steam is admitted. Furthermore, since the door floats on its hinges, the steam pressure is permitted to distribute a uniform closing force over the entire periphery of the seal and thus gasket wear is reduced to a minimum.

Having thus described our invention, we claim:

1. In an apparatus for treating textile articles; a plurality of forms to receive the articles; a chamber to receive the treating medium, closed except for at least one aperture therein to permit movement of said forms into and out of said chamber; a swingable closure for said aperture adapted when open to take a position interiorly of said chamber and adapted, when closed, to seal said chamber under the influence of the pressure of the treating medium, said closure being provided with counter weight means to open said closure automatically upon release of said pressure.

2. In an apparatus for treating textile articles; a plurality of forms to receive the articles; a chamber to receive the treating medium, closed except for at least one aperture therein to permit movement of said forms into and out of said chamber; means to move said plurality of forms into and out of said chamber; a closure for said aperture adapted, when open, to take a position interiorly of said chamber and adapted, when closed, to seal said chamber under the influence of the pressure of the treating medium, said closure being provided with counter weight means to open said closure automatically upon release of said pressure.

3. In an apparatus for treating textile articles, a chamber to receive the treating medium; a plurality of forms to receive the articles; means to move said plurality of forms into and out of said chamber; at least one aperture in said chamber through which said means operates, a closure for said aperture of larger area than said aperture, adapted to overlap said aperture around the entire periphery thereof; hinge means to suspend said closure within said chamber in floating position with respect to said aperture;

and means to bias said closure normally opened.

4. In an apparatus for treating textile articles, a chamber to receive the treating medium; a plurality of forms to receive the articles; means to move said plurality of forms into and out of said chamber; at least one aperture in said chamber through which said means operates, a closure for said aperture of larger area than said aperture, adapted to overlap said aperture around the entire periphery thereof; hinge means to suspend said closure within said chamber in floating position with respect to said aperture; means to bias said closure normally open; and a yieldable element interposed between said closure and said aperture to provide a seal therebetween.

5. In an apparatus for treating textile articles; a chamber; a plurality of forms for receiving said articles; a carriage to support said forms adapted, with said forms, to assume an operating position outside the chamber and a treating position within the chamber; and means for moving said carriage from operating position to treating position, comprising rails within said chamber, rails exteriorly thereof, and trunnions associated with said last mentioned rails and said carriage.

6. In an apparatus for treating textile articles; a chamber; at least one aperture in said chamber; guideways associated with said chamber and adjacent said aperture; a truck adapted for movement along said guideways; a plurality of groups of forms for receiving said articles; a plurality of supports one individual to each said group of forms; means for mounting said supports simultaneously on said truck; means for dissociating any one of said supports from said truck for insertion of the group of forms associated therewith into said chamber.

7. In an apparatus for treating textile articles; a chamber; at least one aperture therein; a plurality of groups of forms for receiving said articles; a plurality of supports one individual to each said group of forms; means common to all said supports simultaneously to carry the same and movable with respect to said aperture; and means for removing a selected support from said common means and inserting said support and its associated forms within said chamber.

8. In an apparatus for treating textile articles; a chamber having at least one aperture therein; a plurality of groups of forms for receiving said articles; a plurality of supports one individual to each said group of forms; means common to all said supports to carry the same and movable with respect to said aperture; means carried on said common means for permitting movement of a selected support from a substantially horizontal position to a substantially vertical position and for permitting movement of said selected support from its position on said common means to within the chamber.

9. In an apparatus for treating textile articles, a chamber having at least one aperture therein; a plurality of groups of forms for receiving said articles; a plurality of carriages one individual to each group of forms; guideways associated with said chamber and parallel to said aperture; a truck adapted to move on said guideways; a plurality of pairs of rails mounted on said truck one pair individual to each said carriage; a trunnion bracket carried on each said rail, a pair of trunnion rollers mounted on each said carriage and cooperating with said trunnion brackets for rolling or pivotal movement of a carriage with respect to its trunnion brackets, said pivotal movement permitting positioning of a group of forms in a substantially horizontal position for treatment and a substantially vertical position for boarding and stripping; wheels on each said carriage for rolling movement on said rails; a pair of rails within said chamber spaced equidistantly to any pair of said first mentioned rails; means for moving said truck along its guideways to align a selected pair of said pairs of first mentioned rails with said pair of second mentioned rails; and means for rolling the carriage individual to said selected pair of first mentioned rails through said aperture on to said second mentioned rails to insert the group of forms on said carriage within the chamber for treatment.

10. In an apparatus for treating textile articles, a chamber; at least one aperture in said chamber, guideways associated with said chamber; a truck adapted to be moved along said guideways transversely of said aperture; a plurality of pairs of rails carried by said truck; a plurality of supports, one individual to each said pair of rails and movable thereon; a plurality of groups of forms to receive said articles adapted to be moved on said rails for insertion of a selected group within the chamber, one group individual to each said support; trunnions intermediate each said pair of rails and each support individual thereto, each said support being swingable about said trunnions, whereby said support may be moved on said rails a predetermined distance and swung with respect to said rails through a predetermined angle.

11. In an apparatus for treating textile articles, a chamber; at least one aperture in said chamber; guideways associated with said chamber; a support movable on said guideways; a plurality of forms to receive the articles carried on said support; trunnions intermediate said support and guideways, said support being swingable on said trunnions, whereby said support may be moved on said guideways a predetermined distance and swung with respect to said guideways through a predetermined angle.

12. In an apparatus for treating textile articles, a chamber of substantially parallelepipedic shape, an aperture in one of the faces thereof; guideways parallel to said face; a carrier adapted to move along said guideways; a plurality of sets of rails supported on said carrier; a set of rails supported within said chamber and of the same gauge as any of said sets of first mentioned rails; means for moving said carrier along its guideways to register any selected pair of first mentioned rails with said second mentioned pair of rails; a plurality of groups of forms for receiving said articles; a plurality of members for supporting each said group of forms, each said member being provided with elements to engage a set of said first mentioned sets of rails associated therewith and the said second mentioned rails to permit the movement of any selected member and its group of forms from a position outside of the chamber to a position within the chamber.

13. In an apparatus for treating textile articles, a chamber; at least one aperture in said chamber; a plurality of groups of forms for receiving said articles for treatment; means for moving a group of forms from a position wherein boarding and stripping of said articles is performed to treating position within the chamber, comprising a set of guideways laterally of said chamber and a second set of guideways longitudinally of said chamber; means for locating a group of forms for insertion in said chamber by movement of said first mentioned set of guideways; and means for effecting movement of the forms through said aperture and axially of the chamber to locate said forms therein for treatment.

14. In an apparatus for treating textile articles, a chamber; at least one aperture therein; a plurality of forms for receiving said articles; means for supporting said forms exteriorly of said chamber in a substantially vertical boarding and stripping position; second means adapted to move said forms from said position to a substantially horizontal position; third means adapted to move said forms from said last mentioned position through said aperture to treating position within the chamber; means for locking said plurality of forms in said boarding and stripping position and comprising a latch; tension means associated with said latch for normally biasing the same into locking position; means for displacing said group of forms from said aperture; and means operable upon actuation of said displacing means to release said latch.

15. In an apparatus for treating textile articles, a chamber; at least one aperture therein; guideways associated with said chamber and transversely of said aperture; a truck movable upon said guideways; a plurality of supports mounted on said truck; a plurality of form carriers one individual to each said support; a plurality of groups of forms to receive said articles one group individual to each said support; a plurality of groups of forms to receive said articles one group individual to each said carrier and carried thereon; means interposed between each said support and its associated carrier for permitting pivotal movement of a carrier from a substantially horizontal position for movement into and out of said chamber through said aperture to a substantially vertical position for boarding and stripping; means interposed between said truck and each said carrier for locking the said carrier in its substantially vertical position; means operable upon said pivotal movement of a carrier to engage said locking means, and means operable upon transverse travel of said truck to release said locking means.

16. Apparatus as in claim 15 in which said last mentioned means comprises a cam adapted to engage said locking means.

17. Apparatus as in claim 15 in which said locking means comprises a pivoted latch adapted to engage a portion of a carrier; a trigger associated with said latch; a cam operative to actuate said trigger upon travel of the truck transversely to release said latch and inoperative on said trigger upon travel of the truck in the opposite direction.

18. In an apparatus for treating textile articles, a plurality of groups of forms for receiving said articles in treating position; a chamber adapted to receive at least one said group at a time for treatment of the articles; guideways associated with said chamber; a truck reciprocably movable upon said guideways transversely of said chamber; a plurality of pairs of rails mounted on said truck; trunnion brackets associated with each said pair of rails; a plurality of form supports one individual to each said group of forms, each said support being provided with trunnion rollers adapted to cooperate with said brackets to permit each said form support to be rotated about the trunnion rollers from a substantially horizontal position to a substantially vertical position; locking mechanism interposed between said truck and each said form support for maintaining the same in said substantially vertical position; and means to actuate said locking mechanism comprising a cam with which each said mechanism is adapted to engage upon movement of the truck from one of its positions to disengage said mechanism from said form support but ineffectual to operate said mechanism upon movement of said truck to its original position.

19. In an apparatus for treating textile articles, a chamber; at least one aperture in said chamber; guideways associated with said chamber; a truck reciprocably movable transversely of said chamber upon said guideways; a plurality of form supports associated with said truck; a plurality of groups of forms for receiving said articles, one said group individual to each said form support; means for moving said truck to position a selected form support for movement through said aperture to within said chamber; and means to lock said truck to maintain said selected form support in operative position with respect to said aperture.

20. In an apparatus for treating textile articles, a chamber; at least one aperture in said chamber; a plurality of groups of forms to receive said articles; a plurality of supports, one individual to each said group, and carrying the same; guideways associated with said chamber and transversely of said aperture; a truck common to all said supports, adapted to be moved reciprocably on said guideways; trunnions interposed between each said support and said truck, said support being swingable about said trunnions from a substantially horizontal position to a substantially vertical position; means for moving said truck to locate a selected support opposite said aperture for insertion of a group of forms in said chamber in article treating position; means to lock said truck in said located position; and means operable after withdrawal of said selected support from the chamber and its location in said vertical position to release said locking means.

21. Apparatus as in claim 20 in which said locking means comprises a spring pressed plunger adapted to enter an aperture on said guideways.

LESLIE H. OSWALD.
ARTHUR S. MANN.
JOHN H. WAHLBECK.